United States Patent [19]

Strong

[11] 4,063,833
[45] Dec. 20, 1977

[54] BOW ADJUSTER

[76] Inventor: Howard D. Strong, 119 Chardon Ave., Chardon, Ohio 44024

[21] Appl. No.: 686,821

[22] Filed: May 17, 1976

[51] Int. Cl.² .............................................. F16B 7/06
[52] U.S. Cl. ...................................... 403/60; 403/118
[58] Field of Search ............ 403/118, 60; 296/120 R, 296/120 A, 128, 131, 104, 105, 10; 285/14

[56] References Cited

U.S. PATENT DOCUMENTS

| 2,217,533 | 10/1940 | Wolarsky | 403/118 X |
| 2,784,015 | 3/1957 | Swanson | 285/14 X |
| 3,516,696 | 6/1970 | Kaim | 403/118 X |

FOREIGN PATENT DOCUMENTS

| 212,708 | 11/1957 | Australia | 403/118 |

Primary Examiner—Wayne L. Shedd
Attorney, Agent, or Firm—Larson, Taylor and Hinds

[57] ABSTRACT

A bow adjuster is provided for adjusting the bows that support, for example, the fabric top of a boat, to insure the proper fit of the material over the support bows. The bow adjuster can adjust the bows to accommodate changes in the material due to stretching or shrinking brought on by aging and various environmental conditions. The bow adjuster includes a bushing which is press fit into one end of a fabric supporting bow. A threaded rod is threaded into this bushing with the opposite end of the rod being fixed within a cylindrical tube. The tube includes a sleeve which telescopes over the end of the fabric supporting bow. The end of the cylindrical tube is mounted on a deck cleat so that the bow adjuster comprises an adjustable link between the fabric supporting bow and the deck. Rotation of the sleeve cause rotation of the threaded rod to move the fabric supporting bow towards or away from the deck cleat to maintain the fabric in a taut condition.

4 Claims, 2 Drawing Figures

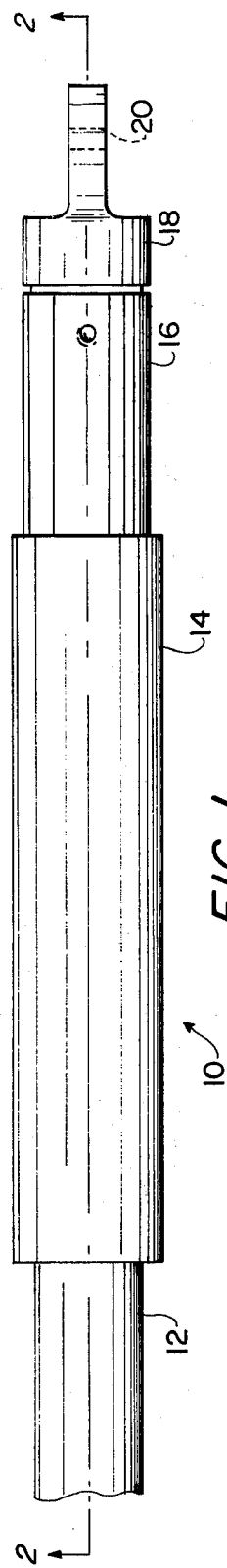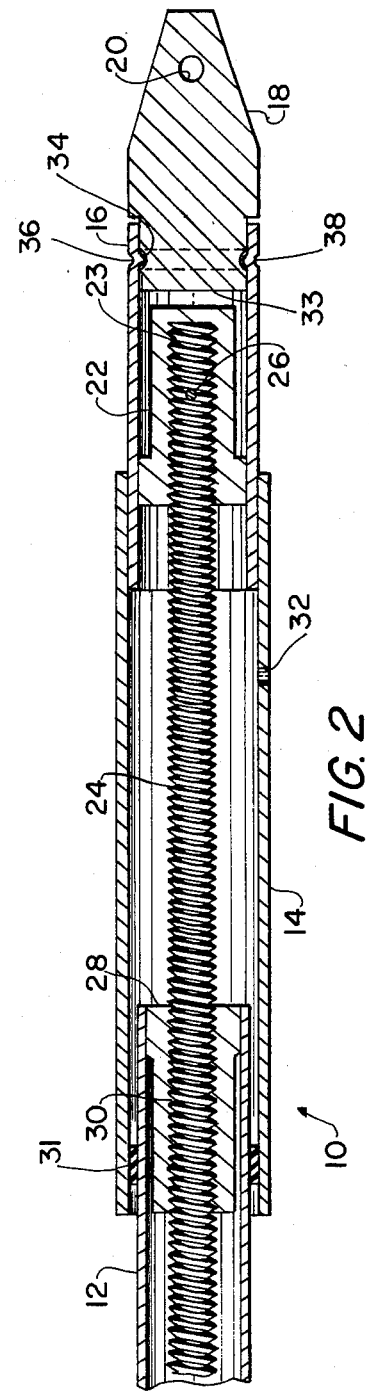

BOW ADJUSTER

BACKGROUND OF THE INVENTION

1. Field of the Invention

This invention relates to bow adjusters and more particularly, to adjusters for bows that support, for example, the fabric top of a boat and insure proper fabric fit.

2. Description of the Prior Art

A variety of prior art devices exist that can be utilized to adjust the length of a member. One such device is disclosed in U.S. Pat. No. 253,313, where an elongate coupling sleeve joins a rod with a right screw thread to a rod with a left screw thread, the rods being colinear. The rotation of the sleeve in one direction draws the rods together along their common axis and the rotation of the sleeve in the opposite direction pushes the rods apart. Thus, the overall length of the rods in this colinear arrangement can be adjusted. A disadvantage with this arrangement is the threads on the rods are not always covered by the sleeve, as for example, when the rods are fully extended out of the sleeve. The threads so exposed, are susceptable to a corrosive environment. Additionally, any lubricating fluids placed on the exposed threads tend to become quickly removed therefrom by, for example, the threads being rubbed against another object. Further, exposed threads create a safety hazard in that, for example, fingers can be caught between the threads and the sleeve as the rods are pulled into the sleeve.

SUMMARY OF THE INVENTION

The present invention provides a bow adjuster that includes an elongate threaded rod and an elongate cylindrical sleeve mounted concentrically about the threaded rod. A bushing having a threaded bore that receives the threaded rod is rigidly attached to the end of a fabric supporting bow. The diameter of the cylindrical sleeve is large enough to accept the bow drawn coaxially therein as the threaded rod and sleeve are rotated so that the bushing progresses along the threaded rod.

A feature of the invention is a swivel bracket rotatably mounted on the sleeve so that the axis of rotation of the bracket is colinear with the elongate threaded rod. This bracket allows the sleeve to be secured to a foundation while remaining rotatable.

The sleeve protectively covers the threaded rod and thus the disadvantages associated with the prior art are avoided. The threaded rod is protected from corrosive forces and additionally, lubrication fluids applied to the threads cannot be rubbed therefrom. Also, an unsafe condition, created by exposed threads is eliminated.

Additional features and advantages of the invention will be set forth in, or apparent from, the detailed description of the preferred embodiments of the invention found hereinbelow.

BRIEF DESCRIPTION OF THE DRAWINGS

FIG. 1 is a plan view of the bow adjuster; and

FIG. 2 is a cross-sectional view taken along line 2—2 in FIG. 1.

DETAILED DESCRIPTION OF THE PREFERRED EMBODIMENTS

Referring to the Figures and in particular to FIG. 1, a bow adjuster 10 is depicted in combination with a portion of a cylindrical, tubular bow 12. The bow 12 maybe the end portion of a bow supporting a fabric top, such as, for example, the fabric top of a boat. Normally the end of the bow would be mounted on a deck bracket. However, to provide for adjusting the tautness of the fabric top the presently disclosed bow adjuster is interposed between the bow end and the deck bracket. Adjuster 10 includes an elongate cylindrical sleeve 14 that coaxially receives bow 12 at one end thereof and that is press-fit over a cylindrical tube 16 at the other end thereof. A swivel bracket 18 with an aperture 20 therethrough is rotatably mounted on the distal end of tube 16 so as to have an axis of rotation generally colinear with the longitudinal axis of elongate sleeve 14.

Referring to FIG. 2, bow adjuster 10 is depicted in cross-section. A first bushing 22 with a threaded bore 23 is press-fit within cylindrical tube 16. An elongate threaded rod 24 is received by the threaded bore 23 of bushing 22. A pin 26 is positionable through a bore in bushing 22 that is generally perpendicular to bore 23. Pin 26 secures threaded rod 24 within bushing 22.

Bow adjuster 10 further includes a second bushing 28 with a threaded bore 30 therein. Second bushing 28 is press-fit into the end of cylindrical, tubular bow 12. Threaded bore 30 of bushing 28 receives the distal end of threaded rod 24. The diameter of cylindrical bow 12 is smaller than that of the cylindrical sleeve 14, so that sleeve 14 can slide over bow 12. An o-ring 31, comprised of, for example, a plastic or a rubber material is secured to the interior surface of the bow-receiving end of sleeve 14 and is coaxial therewith. Further, o-ring 31 is interposed between sleeve 14 and bow 12, so as to seal the bow adjuster from, for example, liquids. Should liquids enter bowadjuster 10, an aperture 32, about 1/16 of an inch in diameter in a preferred embodiment, is provided in sleeve 14 near bushing 22 through which the liquids can escape.

As depicted in FIG. 2, the distal end of tube 16 receives a cylindrical portion 33 of swivel bracket 18. Cylindrical portion 33 includes a circumferential groove 34 formed therein. Swivel bracket 18 is retained in tube 16 by bosses 36 and 38 that extend into groove 34. Bosses 36 and 38 can be formed, for example, by mechanically punching a portion of tube 16 into groove 34. As swivel bracket 18 rotates, bosses 36 and 38 travel in groove 34.

Bow adjuster 10, except for o-ring 31, can be comprised of, for example, metallic elements. In the alternative, several of the elements such as, for example, the bushings, can be comprised of tough plastic material.

The operation of bow adjuster 10 in combination with the bows supporting the fabric top of a boat is as follows. The bows, with a fabric coverings, are erected. Aperture 20 is secured to a deck bracket of the boat. Sleeve 14 is rotated about its longitudinal axis causing the bushing 28 to progress along threaded rod 24 either towards or away from the bushing 22. As this occurs, the bow may be moved towards or away from the deck so as to maintain the fabric top covering the bows taut. The bow adjuster, as is evident from the previous discussion, can accommodate material stretching or shrinking due to aging of the material or to environmental conditions.

Although the present invention has been described relative to an exemplary embodiment thereof, it will be appreciated by those skilled in the art that modifications and variations can be effected in these embodiments without departing from the scope and spirit of the invention.

I claim:

1. An adjuster for adjusting the length of a bow comprising:
   an elongate threaded rod;
   a cylindrical sleeve;
   means for mounting said sleeve on said rod so that said sleeve extends coaxially about said threaded rod, wherein said mounting means includes a first bushing having a threaded bore that receives said threaded rod, said first bushing being force fit into said sleeve so as to be positioned adjacent a first end of said sleeve;
   a swivel bracket rotatably mounted on said sleeve, the axis of rotation of said bracket being colinear with the longitudinal axis of said elongate threaded rod, wherein said swivel bracket includes a cylindrical portion having a circumferential groove, said cylindrical portion being received in the first end of said sleeve, said first end of said sleeve including bosses extending into said groove from the interior surface of said sleeve for retaining said cylindrical portion therein while allowing said bracket to rotate;
   a second bushing, having a threaded bore that receives said threaded rod, said second bushing rigidly attached to the end of the bow, the end of the bow being telescopically received within a second end of the sleeve, said sleeve being rotatably so that said second bushing progresses along said threaded rod relative to said mounting means; and
   an o-ring interposed between said sleeve and the end of bow so as to seal said adjuster, said o-ring comprised of a resilient material.

2. An adjuster in accordance with claim 1 wherein said first bushing having a second bore perpendicular to said threaded bore for receiving a pin for lockingly positioning said first bushing on said threaded rod.

3. An adjuster in accordance with claim 1 wherein said sleeve includes an aperture therein for allowing foreign material to escape therefrom.

4. An adjuster the length of a bow comprising:
   an elongate threaded rod;
   a cylindrical sleeve;
   means for mounting said sleeve on said rod so that said sleeve extends coaxially about said threaded rod, wherein said mounting means includes a mounting tube with a first bushing fixedly mounted therein, said first bushing having a threaded bore for receiving said threaded rod and wherein said mounting tube has a diameter smaller than the diameter of said sleeve, said tube being force fit into one end of said sleeve so as to be colinear therewith;
   a second bushing, having a threaded bore that receives said threaded rod, said second bushing rigidly attached to the end of the bow, the end of the bow being telescopically received within the end of the sleeve, said sleeve being rotatable so that said second bushing progresses along said threaded rod relative to said mounting means;
   a swivel bracket rotatably mounted on said mounting tube, the axis of rotation of said bracket being colinear with the longitudinal axis of said elongate threaded rod, wherein said swivel bracket includes a cylindrical portion having a circumferential groove, said cylindrical portion being received in one end of said mounting tube, said mounting tube including bosses extending into said groove from the interior surface of said tube for retaining said cylindrical portion therein while allowing said bracket to rotate; and
   an o-ring interposed between said sleeve and the end of the bow so as to seal said adjuster, and wherein said sleeve includes an aperture therein for allowing foreign material to escape therefrom.

* * * * *